United States Patent [19]

Yu et al.

[11] Patent Number: 4,794,356

[45] Date of Patent: Dec. 27, 1988

[54] MOLDED CASE CIRCUIT BREAKER AUXILIARY SWITCH UNIT

[75] Inventors: Yuet-Ying Yu, Danbury; Robert A. Morris, Burlington; Paul T. Rajotte, Plainville; Lee A. Wambolt, Colchester, all of Conn.

[73] Assignee: General Electric Company, New York, N.Y.

[21] Appl. No.: 133,868

[22] Filed: Dec. 16, 1987

[51] Int. Cl.⁴ .................... H02B 1/08

[52] U.S. Cl. .................... 335/13; 200/331; 361/115; 361/357

[58] Field of Search .................... 335/6, 8, 9, 10, 13-15, 335/18, 20, 23, 35, 38, 132, 167-172, 174, 202; 200/56 R, 50 A, 303, 307, 308, 330, 331; 361/115, 331, 334, 335, 356, 357, 376, 393, 394, 426, 429

[56] References Cited

U.S. PATENT DOCUMENTS

| | | | |
|---|---|---|---|
| 4,297,663 | 10/1981 | Seymour et al. | 335/20 |
| 4,589,052 | 5/1986 | Dougherty | 361/94 |
| 4,591,942 | 5/1986 | Willard et al. | 361/97 |
| 4,622,444 | 11/1986 | Kandatsu et al. | 200/303 |
| 4,652,975 | 3/1987 | Scott | 361/404 |
| 4,679,019 | 7/1987 | Todaro et al. | 335/172 |
| 4,700,161 | 10/1987 | Todaro et al. | 335/172 |

OTHER PUBLICATIONS

Ser. No. 078,322 entitled "Molded Case Circuit Breaker Crossbar Assembly", Roger N. Castonguay et al., filed 7/27/87.

Ser. No. 092,962 entitled "Mold Case Circuit Breaker Latch And Operating Mechanism Assembly", Roger N. Castonguay, et al., filed 9/3/87.

Ser. No. 045,645 entitled "Rating Plug Enclosure For Molded Case Circuit Breakers", Robert A. Morris et al., filed 5/4/87.

Ser. No. 061,244 entitled "Molded Case Circuit Breaker Accessory Enclosure", Paul A. Raymont et al., filed 6/12/87.

*Primary Examiner*—G. P. Tolin

*Attorney, Agent, or Firm*—Richard A. Menelly; Walter C. Bernkopf; Fred Jacob

[57] ABSTRACT

An integrated protection unit is a circuit breaker which includes basic overcurrent protection facility along with selective electrical accessories. A molded plastic accessory access cover secured to the integrated protection unit cover protects the accessory components contained within the circuit breaker cover from the environment. An auxiliary switch unit is one such accessory component which can be field-installed without affecting the integrity of the circuit breaker overcurrent protection components.

9 Claims, 4 Drawing Sheets

MOLDED CASE CIRCUIT BREAKER AUXILIARY SWITCH UNIT

BACKGROUND OF THE INVENTION

The trend in the circuit protection industry is currently toward complete circuit protection which is accomplished by the addition of supplemental protection apparatus to standard overcurrent protective devices, such as molded case circuit breakers. In the past, when such auxiliary protection apparatus or other circuit breaker accessories were combined with a standard circuit breaker, the accessories were usually custom-installed at the point of manufacture. The combined protective device, when later installed in the field, could not be externally accessed for inspection, replacement or repair without destroying the integrity of the circuit breaker interior. An example of one such factory installed circuit breaker accessory is found in U.S. Pat. No. 4,297,663 entitled "Circuit Breaker Accessories Packaged in a Standardized Molded Case", which Patent is incorporated herein for reference purposes.

A more recent example of a circuit breaker including additional accessories is found in U.S. Pat. No. 4,622,444 entitled "Circuit Breaker Housing and Attachment Box" which allows the accessories to be field-installed within the circuit breaker without interfering with the integrity of the circuit breaker internal components. This is accomplished by mounting the accessories within a recess formed in the circuit breaker enclosure cover.

An electronic trip actuator which is mounted within the circuit breaker enclosure is described within U.S. Pat. No. 4,679,019 entitled "Trip Actuator for Molded Case Circuit Breakers". The circuit breaker actuator responds to trip signals generated by an electronic trip unit completely contained within a semi-conductor chip such as that described within U.S. Pat. No. 4,589,052. The development of a combined trip actuator for both overcurrent protection as well as accessory function is found within U.S. Pat. No. 4,700,161 entitled "Combined Trip Unit and Accessory Module for Electronic Trip Circuit Breakers". The aforementioned U.S. patents which represent the advanced state of the art of circuit protection devices are incorporated herein for reference purposes.

An integrated protection unit having both overcurrent protection along with a shunt trip accessory unit is described within concurrently filed U.S. patent application Ser. No. (133,867) entitled "Molded Case Circuit Breaker Shunt Trip Unit" and U.S. patent application Ser. No. (133,869) entitled "Molded Case Circuit Breaker Multiple Accessory Unit" which Applications are incorporated herein for purposes of reference.

When the integrated protection unit is located remotely from the protected industrial equipment, it is important for the equipment operator to ascertain the status of the operating power supplied to the equipment. An auxiliary switch, installed within the breaker enclosure at the factory interacts with the circuit breaker operating mechanism to provide an electronic indication of the "ON - OFF" condition of the circuit breaker contacts, usually by means of color-coded indicating lights.

One purpose of the instant invention is to provide an auxiliary switch unit which is field-installable and which is capable of indicating the conditions of the circuit breaker contacts at a location remote from the circuit breaker.

SUMMARY OF THE INVENTION

An integrated protection unit which includes overcurrent protection along with auxiliary accessory function, contains an access cover for the selected accessory components, to allow field installation of the accessory components prior to connecting the integrated protection unit within an electric circuit. One such accessory unit comprises a field-installable auxiliary switch which is installed in the circuit breaker cover and extends downward to the circuit breaker operating mechanism. When the circuit breaker is turned on or off, the auxiliary switch unit interacts with the circuit breaker operating mechanism molded plastic crossbar to provide an output signal to a remote indicating light indicative of the "ON - OFF" condition of the circuit breaker contacts.

DESCRIPTION OF THE PREFERRED EMBODIMENT

Figure 1:
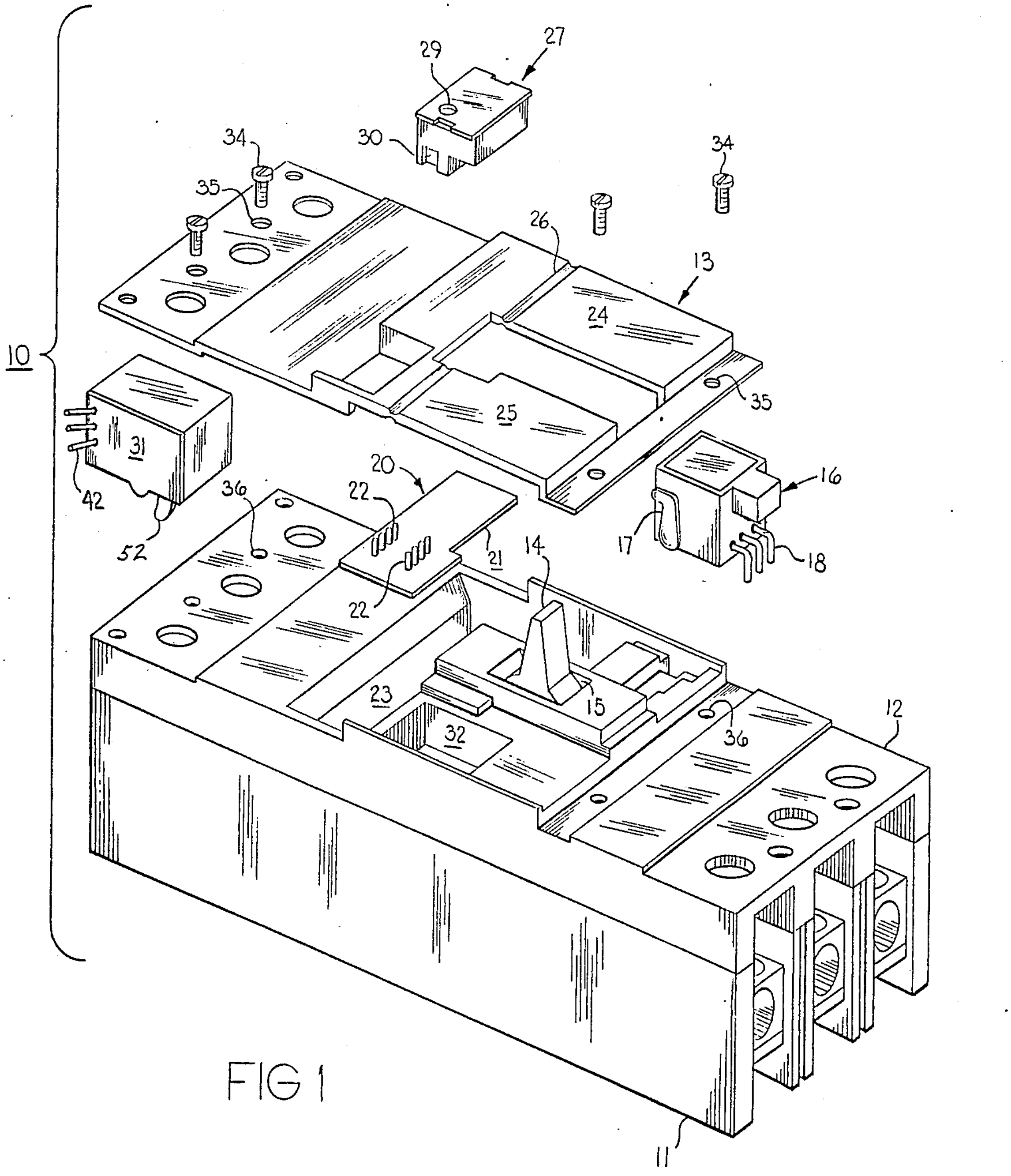
FIG. 1 is an exploded top perspective view of an integrated protection unit containing the auxiliary switch unit according to the invention.

An integrated circuit breaker 10 consisting of a molded plastic case 11 with a molded plastic cover 12 is shown in FIG. 1 prior to assembly of the accessory cover 13. The circuit breaker operating handle 14 extends up from an access slot 15 formed in the circuit breaker cover 12. An electromagnetic actuator 16, such as described in the aforementioned U.S. Pat. Nos. 4,679,019 and 4,700,161 is fitted with an actuator lever 17 for interrupting the circuit breaker operating mechanism (not shown). The operating mechanism is similar to that described within U.S. patent application Ser. No. 092,962, filed Sept. 3, 1987 entitled "Molded Case Circuit Breaker Latch and Operating Mechanism Assembly", which Application is incorporated herein for purposes of reference. The electromagnetic actuator 16 connects with an electronic trip unit 20 by means of wire conductors 18. The trip unit 20 is in the form of a printed wire board 21 which is inserted in the printed wire board recess 23 formed in the circuit breaker cover 12 and which connects electrically with a rating plug 27 by means of pins 22 upstanding on the printed wire board and sockets 30 formed in the bottom of the rating plug 27. The rating plug is described in U.S. patent application Ser. No. 045,645, filed May 4, 1987, entitled "Rating Plug Enclosure for Molded Case Case Circuit Breakers", which Application is incorporated herein for purposes of reference. Access opening 29 formed on the top of the rating plug 27 allows for verifying the trip characteristics of the electronic trip unit 20. The electronic trip unit electrically connects with a current transformer (not shown) contained within the integrated circuit breaker case 11 and which is described in U.S. Pat. No. 4,591,942, which Patent is incorporated herein for purposes of reference. The integrated circuit breaker 10 depicted in FIG. 1 includes three poles, with one current transformer supplied within each separate pole. In accordance with the instant invention, an auxiliary switch unit 31 is inserted within an auxiliary switch recess 32 formed in the integrated circuit breaker cover 12 and is positioned such that a depending lever 52 interacts with the circuit breaker operating mechanism in a manner to be described below in greater detail. Three wire conductors 42 electrically connect with a remote signal indicating device (not shown) such as a pair of color-coded indicating lamps to indicate the conditions of the circuit breaker contacts (FIG. 3) when the operating handle 14 is in its "ON" and "OFF" position. The accessory cover 13 is attached to the integrated circuit breaker cover 12 by means of screws 34, thru-holes 35 formed within the accessory cover 13 and threaded openings 36 formed within the integrated circuit breaker cover 12. Access to the actuator 16 is made by means of accessory door 24 integrally formed within the accessory cover 13 and access to the auxiliary switch 31 is made by means of accessory door 25. The accessory doors 24, 25 are hingably attached to the accessory cover 13 by means of a hinge 26 integrally formed therein. A good description of the accessory cover 13 is found within U.S. patent application Ser. No. 061,244, filed June 12, 1987 and entitled "Molded Case Circuit Breaker Accessory Enclosure", which Application is incorporated herein for reference purposes.

Figure 2:
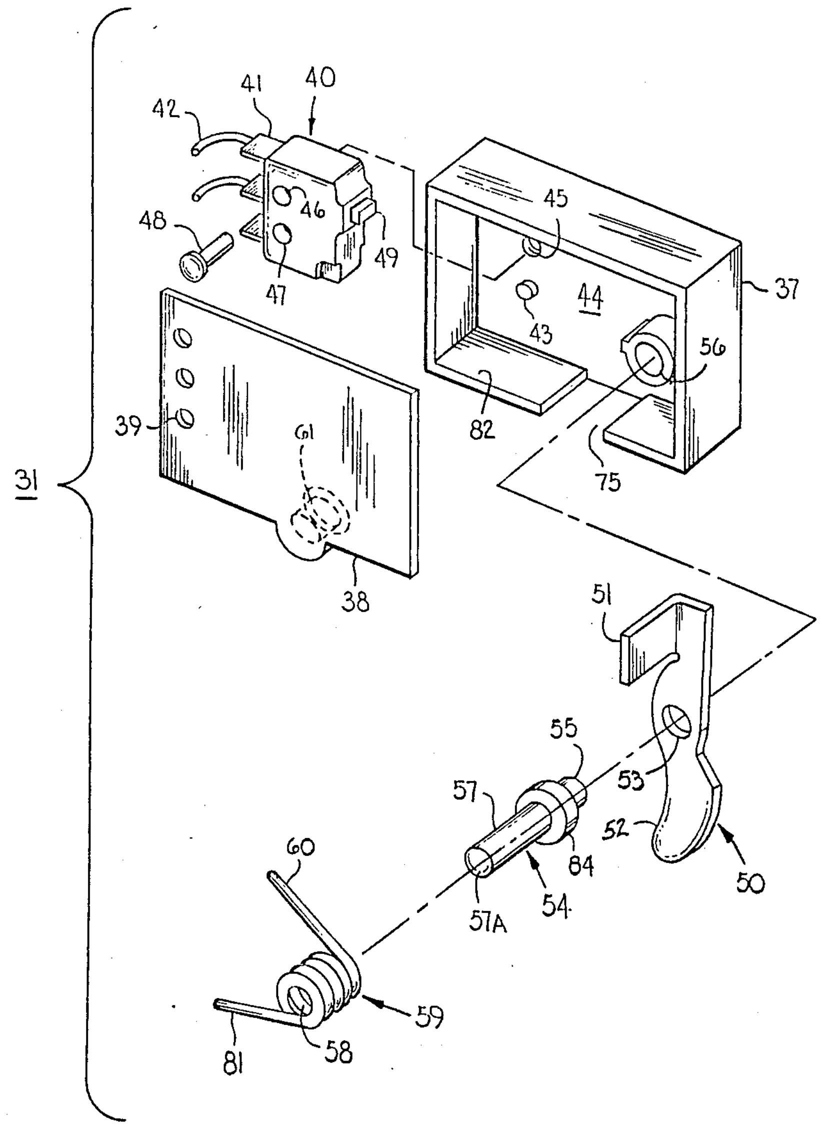
FIG. 2 is an exploded top perspective view of the auxiliary switch unit within the integrated protection unit of FIG. 1.

The components within the auxiliary switch 31 are shown in FIG. 2 prior to assembly. The auxiliary switch consists of a molded plastic case 37 and a complementary molded plastic cover 38. An electric switch 40 is positioned within the case by means of a locating post 43 integrally formed in the bottom 44 of the case 37 and a locating thru-hole 47 formed within the switch. A rivet 48 passes through the thru-hole 46 formed in the switch and is fastened within the opening 45 formed in the bottom 44. The locating post 43 and rivet 48 position the switch plunger 49 at an exact location within the case 37. Three contact blades 41 extending from the side of the electric switch 40 connect with the exterior signal device, described earlier, by means of wire conductors 42 which exit through the cover 38 by means of thru-holes 39 formed within the cover. An operating lever 50 is positioned within the case 37 by passing one end 55 of a pivot pin 54 through an opening 53 in the operating lever and then within the journal bearing 56 integrally formed on the bottom 44 of the case 37. A collar 84 on the pivot pin traps the pivot pin within the journal bearing to bias a tab 51 on the operating lever 50 against the switch plunger 49, a torsion spring 59 is arranged on the barrel 57 of the pivot pin 54 by means of a central opening 58 extending through the spring. The spring is retained within the case 37 by positioning one spring leg 81 on a side wall 82 formed on the case and positioning the other spring leg 60 on the opposite surface of tab 51. The end 57A of the barrel 57 nests within an opening 61 formed on the inner surface of the cover 38. The cover is then attached to the case by ultrasonic welding and the lever arm 52 of the operating lever 50 extends outside the case through the access slot 75 formed through the side wall 82. A shunt trip unit such as described earlier referenced U.S. patent application Ser. No. (133,867) can be attached to the opposite sides of the auxiliary switch case 37, if so desired.

Figure 3:
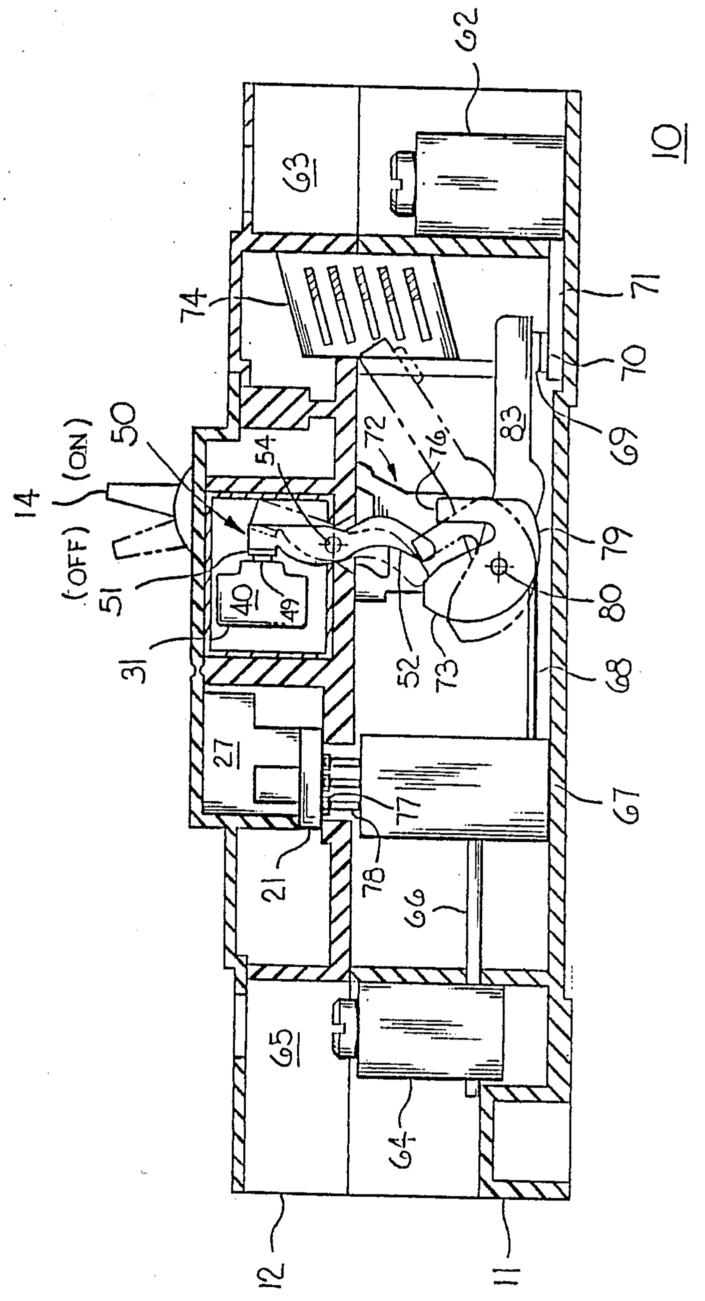
FIG. 3 is a cut-away side view of the assembled integrated protection unit of FIG. 2.

The auxiliary switch 31 operates in the manner depicted in FIG. 3 wherein the integrated circuit breaker 10 is shown with part of its cover 12 and case 11 removed to depict the interaction between the auxiliary switch operating lever 50 and the circuit breaker operating mechanism generally shown at 72. The operating lever arm 52 interacts with the operating mechanimm molded plastic crossbar 73 attached to the circuit breaker operating mechanism 72. The operating mechanism molded plastic crossbar 73 is described within U.S. patent application Ser. No. 078,322, filed July 27, 1987 and entitled "Molded Case Circuit Breaker Crossbar Assembly" which Application is incorporated herein for reference purposes. Extended electrical connection with the circuit breaker contacts 69, 70 from the line side of the integrated circuit breaker 10 is made by means of a line lug 62 located within the line lug compartment 63 and a line strap 71. Extended electrical connection from the load side is made by means of the load lug 64 located within the load lug compartment 65, the load strap 66, current transformer 67 and flexible conductor 68 which connects with the movable contact arm 83. The electric current is sensed within the current transformer 67 which interconnects with the printed wire board 21 by means of pins 78 on the current transformer and sockets 77 on the printed wire board. The interconnection between the current transformer and the printed wire board is described within U.S. Pat. No. 4,652,975 entitled "Mounting Arrangement for Circuit Breaker Current Sensing Transformers", which Patent is incorporated herein for reference purposes. The printed wire board 21 connects with the rating plug 27, as described earlier. In response to overcurrent conditions through the integrated circuit breaker, the operating mechanism 72 drives the movable contact arm 83 and its attached contact 69 to the position indicated in phantom to interrupt the circuit current between the contact 69 and 70. The current through the contacts can also be interrupted by manual movement of the operating handle 14 from its "ON" condition to the "OFF" condition indicated in phantom. As described earlier, it ss desirable that the condition of the circuit breaker contacts 69, 70 be indicated at a remote location by means of the auxiliary switch 31. In the "ON" condition of the integrated circuit breaker 10, the tab 51 on the operating lever 50 contacts the switch plunger 49 on the electric switch 40. In the "OFF" position, the operating tab 51 is driven away from the plunger 49 by contact with the end 76 of the operating cam arm 79, as shown in phantom. If the contacts 69, 70 are interrupted while current is flowing therebetween, an electric arc is generated and is extinguished within the arc chute 74 positioned ahead of the contact within the integrated circuit breaker case 11.

Figure 4A:
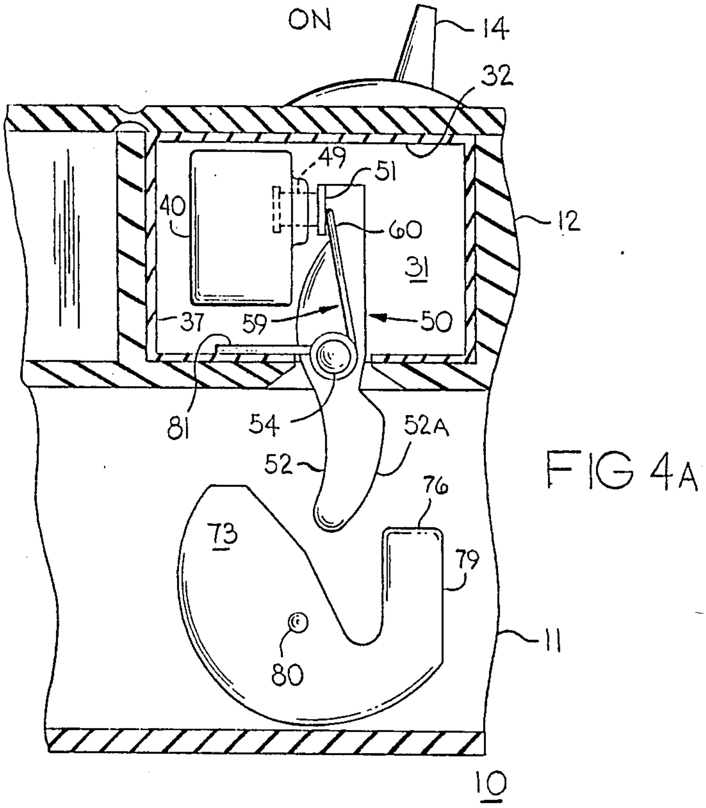
FIG. 4A is a cut-away side view of a part of the integrated protection unit of FIG. 1 depicted in the "ON" condition.
Figure 4B:
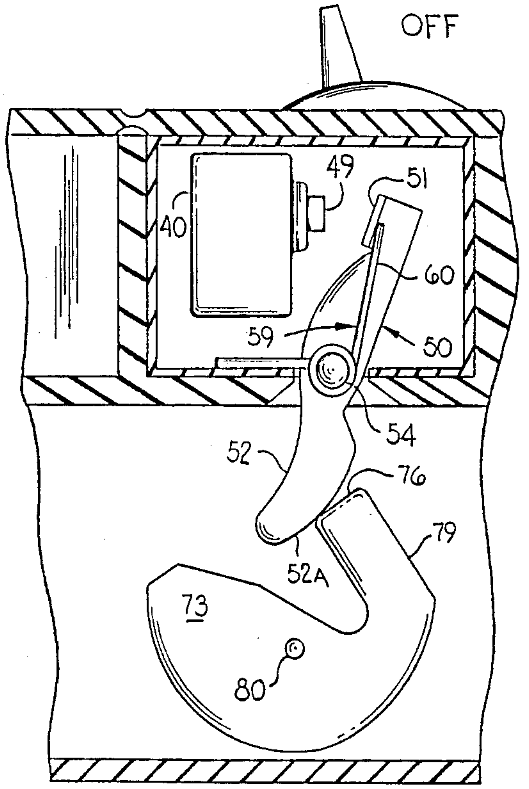
FIG. 4B is a cut-away side view of the integrate protection unit of FIG. 1 depicted in the "OFF" condition.

The interaction between the operating lever 50 as it rotates about its pivot pin 54 and the operating mechanism molded plastic crossbar 73 as it rotates about its pivot 80 is best seen by referring now to FIGS. 4A and 4B.

It is noted that when the operating handle 14 is in the "ON" position, as indicated within the integrated circuit breaker 10 in FIG. 4A, the tab 51 on the operating lever 50 is held in contact with the switch plunger 49 on the electric switch 40 by the bias provided through the torsion spring 59 and the location of the spring legs 81, 60 as indicated. The auxiliary switch 31 is depicted within the recess 32 in the integrated circuit breaker cover 12 with the accessory switch cover removed along with part of the integrated circuit breaker cover 12 and part of the integrated breaker case 11 removed. The components within the auxiliary switch case 37 are exposed to clearly depict the operating lever pivot pin 54 and the position of the operating lever arm 52 relative to the operating mechanism molded plastic crossbar 73. In the "ON" position, the cam arm 79 is positioned to the right of its pivot 80 such that the end 76 of the cam arm 79 is out of contact with the operating lever arm 52. When the operating mechanism molded plastic crossbar 73 is rotated in the counterclockwise direction, as indicated in FIG. 4B, the end 76 of the cam arm 79 is driven against the operating lever arm 52 rotating the operating lever 50 clockwise about its pivot 54 against the bias provided by the spring leg 60 of the torsion spring 59 against tab 51. The switch plunger 49 on the electric switch 40 returns to its original position until such time as the integrated circuit breaker operating mechanism rotates the operating mechanism molded plastic crossbar 73 about its pivot 80 in the clockwise direction to return to the position depicted in FIG. 4A. The operating lever 50 then rotates in a counterclockwise direction about its pivot 54 to bring the tab 51 back into contact with the plunger 49 under the return bias of the torsion spring leg 60 to the position shown in FIG. 4A. The cam surface 52A on operating lever arm 52 allows the installation of the auxiliary switch 31 in either the "ON" or "OFF" positions of the contacts. It is noted that the separate spring bias to the operating lever 5O provided by the torsional spring 59 allows the auxiliary switch 31 to be installed within a wide variety of circuit breaker designs.

It is thus been shown that an auxiliary switch can be field-installed within an integrated circuit breaker without interferring with the internal circuit breaker operating components. The auxiliary switch interacts with the circuit breaker operating molded plastic crossbar to accurately indicate the position of the circuit breaker contacts at a remote location.

Having thus described my invention, what I claim as new and desire to secure by Letters Patent is:

1. Molded case circuit breaker and accessory comprising:

a molded plastic circuit breaker cover and case, said cover defining an enclosure space;

a pair of separable contacts within said case having closed and open conditions;

a circuit breaker operating mechanism within said case and associated with said contacts and opening said contacts upon the occurrence of a current through said contacts in excess of a predetermined current;

electromagnetic actuator means within said circuit breaker cover enclosure space associated with said circuit breaker operating mechanism and articulating said operating mechanism to open said contacts upon the occurrence of said excess current; and an accessory unit substantially within said circuit breaker cover enclosure space proximate said operating mechanism, an operating lever on said accessory unit interacting with means on said operating mechanism and having means providing remote indication of said closed and open conditions of said contacts.

2. The molded case circuit breaker and accessory of claim 1 wherein said means on said operating mechanism comprises a molded plastic crossbar.

3. The molded case circuit breaker and accessory of claim 1 including an accessory cover and case.

4. The molded case circuit breaker and accessory of claim 3 including an electric switch within said accessory case, said operating lever having one end interacting with said electric switch and an opposite end interacting with said circuit breaker crossbar.

5. The molded case circuit breaker and accessory of claim 4 wherein one end of said operating lever is biased into contact with said electric switch by means of a torsion spring.

6. The molded case circuit breaker and accessory of claim 5 wherein an opposite end of said operating lever extends through an opening in a bottom of said accessory case.

7. The molded case circuit breaker and accessory of claim 6 wherein said torsion spring includes a first end and a second end, said first end abutting said bottom of said accessory case and said second end abutting a tab extending from said one end of said operating lever.

8. The molded case circuit breaker and accessory of claim 7 wherein said electric switch includes a plunger.

9. The molded case circuit breaker and accessory of claim 8 wherein said tab is in contact with said plunger when said contacts are closed and wherein said tab is out of contact with said plunger when said contacts are open.

* * * * *